United States Patent
Schellens

(10) Patent No.: US 11,608,960 B1
(45) Date of Patent: Mar. 21, 2023

(54) CARGO VAN REAR DOOR WARNING LIGHT AND ILLUMINATION SYSTEM

(71) Applicant: Thomas E. Schellens, Old Lyme, CT (US)

(72) Inventor: Thomas E. Schellens, Old Lyme, CT (US)

( * ) Notice: Subject to any disclaimer, the term of this patent is extended or adjusted under 35 U.S.C. 154(b) by 0 days.

(21) Appl. No.: 17/681,526

(22) Filed: Feb. 25, 2022

Related U.S. Application Data

(60) Provisional application No. 63/156,250, filed on Mar. 3, 2021.

(51) Int. Cl.
| | | |
|---|---|---|
| *F21S 43/19* | (2018.01) | |
| *F21V 21/08* | (2006.01) | |
| *F21V 23/04* | (2006.01) | |
| *F21V 21/088* | (2006.01) | |
| *F21W 103/00* | (2018.01) | |
| *F21W 107/10* | (2018.01) | |

(52) U.S. Cl.
CPC .......... *F21S 43/19* (2018.01); *F21V 21/0808* (2013.01); *F21V 21/088* (2013.01); *F21V 23/0492* (2013.01); *F21W 2103/00* (2018.01); *F21W 2107/10* (2018.01)

(58) Field of Classification Search
CPC .... F21S 43/19; F21V 21/0808; F21V 21/088; F21V 23/0492; F21W 2103/00; F21W 2107/10; B60Q 1/247; B60Q 1/2669; B60Q 1/323; B60Q 1/324
See application file for complete search history.

(56) References Cited

U.S. PATENT DOCUMENTS

| | | | | |
|---|---|---|---|---|
| 5,523,926 A | * | 6/1996 | Gold | B60Q 1/324 340/472 |
| 5,560,702 A | * | 10/1996 | Gold | B60Q 1/30 340/471 |
| 5,567,036 A | * | 10/1996 | Theobald | F21V 5/04 362/800 |
| 5,613,755 A | * | 3/1997 | Gold | B60Q 1/30 340/472 |
| 5,668,530 A | * | 9/1997 | Gold | B60Q 1/30 340/471 |
| 5,683,165 A | * | 11/1997 | Gold | B60Q 1/30 340/472 |
| 5,711,593 A | * | 1/1998 | Gold | B60Q 1/324 340/471 |
| 5,796,519 A | * | 8/1998 | Gold | B60Q 1/30 359/549 |
| 5,842,770 A | * | 12/1998 | Gold | B60Q 1/324 340/471 |
| 5,864,429 A | * | 1/1999 | Gold | B60Q 1/30 116/28 R |

(Continued)

*Primary Examiner* — Zheng Song
(74) *Attorney, Agent, or Firm* — Fattibene and Fattibene LLC; Paul A. Fattibene

(57) ABSTRACT

An illuminations system placed on a rear cargo van door providing auxiliary lighting to improve safety. Light modules are attached to the rear cargo van doors so that when the doors are opened an amber warning light is illuminated along the edge of the open cargo van door pointing rearward. A task light preferably is incorporated in the light modules to provide downward task lighting. The lighting modules are attached adjacent edges of the rear cargo van doors without permanent modification to the cargo van.

8 Claims, 10 Drawing Sheets

(56) References Cited

U.S. PATENT DOCUMENTS

| | | | |
|---|---|---|---|
| 8,511,526 B2 | 8/2013 | Schellens | 224/326 |
| 10,479,282 B2 | 11/2019 | Schellens | B60R 9/04 |
| 11,220,208 B1 | 1/2022 | Schellens | B60Q 3/001 |
| 2014/0268775 A1* | 9/2014 | Kennemer | B60Q 1/24 |
| | | | 362/369 |
| 2014/0300462 A1* | 10/2014 | Russ | B60Q 1/2692 |
| | | | 340/471 |
| 2014/0300464 A1* | 10/2014 | Chen | B60Q 1/2607 |
| | | | 340/471 |
| 2016/0001700 A1* | 1/2016 | Salter | F21S 43/26 |
| | | | 362/543 |
| 2016/0193954 A1* | 7/2016 | Nakada | B60Q 1/2696 |
| | | | 362/511 |
| 2016/0332563 A1* | 11/2016 | Tseng | B60Q 1/30 |
| 2018/0050820 A1* | 2/2018 | Jha | F21S 43/26 |
| 2021/0155138 A1 | 5/2021 | Schellens | B60N 3/001 |

* cited by examiner

CARGO VAN REAR DOOR WARNING LIGHT AND ILLUMINATION SYSTEM

RELATED APPLICATION

This application claims the benefit of U.S. Provisional Application No. 63/156,250 filed Mar. 3, 2021, which is herein incorporated by reference.

FIELD OF THE INVENTION

The present invention relates in general to the attachment of a warning light and illumination system to the rear of a cargo van, and more particularly to the attachment of a warning light and illumination system to each door of a center-high type cargo van without modification or damage to the cargo van.

BACKGROUND OF THE INVENTION

Over the past few years the advent of the on-line economy has driven a new phenomenon of new forms for delivering goods to an end user. Massive fleets of mid-size tall vans or center-high type vans now travel the quiet streets of residential neighborhoods with deliveries occurring late into the evening. Especially in the winter months, the hazards presented by a delivery vehicle temporarily parked at the curb are growing. There are many situations where supplemental emergency or warning lights are desired to be attached to a delivery van such as a Dodge or Mercedes Sprinter, or Ford Transit or other vehicles. During the normal operation of a delivery van, the operator will pull to the curb, activate the 4-way flashers, exit the vehicle and approach the rear cargo doors. Warning lights for the outline or ends of the cargo vans are generally mounted on the left and right rear quarters of the cargo vans and provide a rear facing amber illumination to provide oncoming traffic ample identification or warning of a stopped vehicle. A difficulty in existing warning lighting system occurs when the rear cargo doors are opened fully to a ninety degree position for access to the contents or packages in the cargo van. With the doors in this open position, the rear facing amber illumination in the rear of the cargo van is almost completely blocked by the open door. This is hazardous as oncoming traffic may not see the stopped cargo van or the driver or worker creating an extremely dangerous situation for the driver or worker taking cargo or packages out of the cargo van. Additionally, the driver or worker only has the lighting from within the van to illuminate the cargo area, the street, or other nearby surfaces.

While there have been devices to mount emergency lights to the roof of a vehicle, the height of the current design of cargo vans or other delivery vehicles presents an area of ineffectiveness as approaching vehicles get closer to the cargo van. Therefore, there is a need to improve the safety of drivers or workers making deliveries using center high cargo vans or other vehicles that have rear facing doors that swing open.

SUMMARY OF THE INVENTION

The present invention provides a warning light and illumination device and system for vehicles, and particularly cargo vans. The warning light and illumination system comprises two mirror image light modules that are securely attached to each rear door near the center of the cargo van where the two rear door edges meet. One of the two light modules is mounted near each of the center edges of the rear cargo van doors of the cargo van or vehicle. Each light module of the warning light and illumination system may be attached to the doors by any means for attaching, but preferably by an attachment device that does not require modification or damage to the cargo van, such as by clamping, adhesive, or pressure sensitive adhesive tape. The light modules may be attached to the existing metal skin or rear window glass of the cargo van or vehicle at an elevation above the ground so as to provide suitable visibility and illumination for the driver or worker. A preferred elevation above the ground may be approximately seventy-two inches. The warning light and illumination system comprises two light modules coupled to the electrical system of the cargo van. Each light module comprises an amber LED lighthead or light source mounted such that the amber warning light is emitted in a horizontal manner to the rear of the cargo van. Preferable, each light module includes a downward facing LED flood light, white light source, or other light source for ground illumination.

When the light modules are attached to the closed cargo van doors, the light modules may appear as a black ABS plastic applique. When the cargo van doors are open, and preferably when the four-way flashers of the cargo van activated, the amber warning light source will emit an illuminated amber warning signal rearward in a direction parallel to the surface of the road. Additionally, the light modules may have downward LED flood light or white light source directed downward for illuminating the street or work area.

It is an object of the present invention to provide improved safety for workers operating cargo vans.

It is an advantage of the present invention that it can be installed in existing cargo vans without modifying the cargo van.

It is a feature of the present invention that it is mounted on an edge of a cargo van door and configured to provide a rearward warning light and downward task lighting when the cargo van door is opened.

It is an advantage of the present invention that the light module is easily installed.

It is a further advantage of the present invention that the light module may be attached to the cargo van without the drilling of any holes.

It is a feature of the present invention that it uses the existing surface of the cargo van to securely attach the light module.

It is another feature of the present invention that the light module is of such a size that it will not block any of the view area of the rear windows of the cargo van.

It is a further feature of the present invention that the view area of the light module will be controlled by the position of the cargo van rear door.

It is a further feature of the present invention that the view area of the illumination from the light module will be in a field of one hundred and twenty degrees controlled by the position of the cargo van rear door.

It is a further feature of the present invention that the light module preferably has a downward LED flood light or task light source illuminating the street and work area.

These and other objects, advantages, and features will become readily apparent in view of the following more detailed description.

DETAILED DESCRIPTION OF THE PREFERRED EMBODIMENTS

Figure 1:
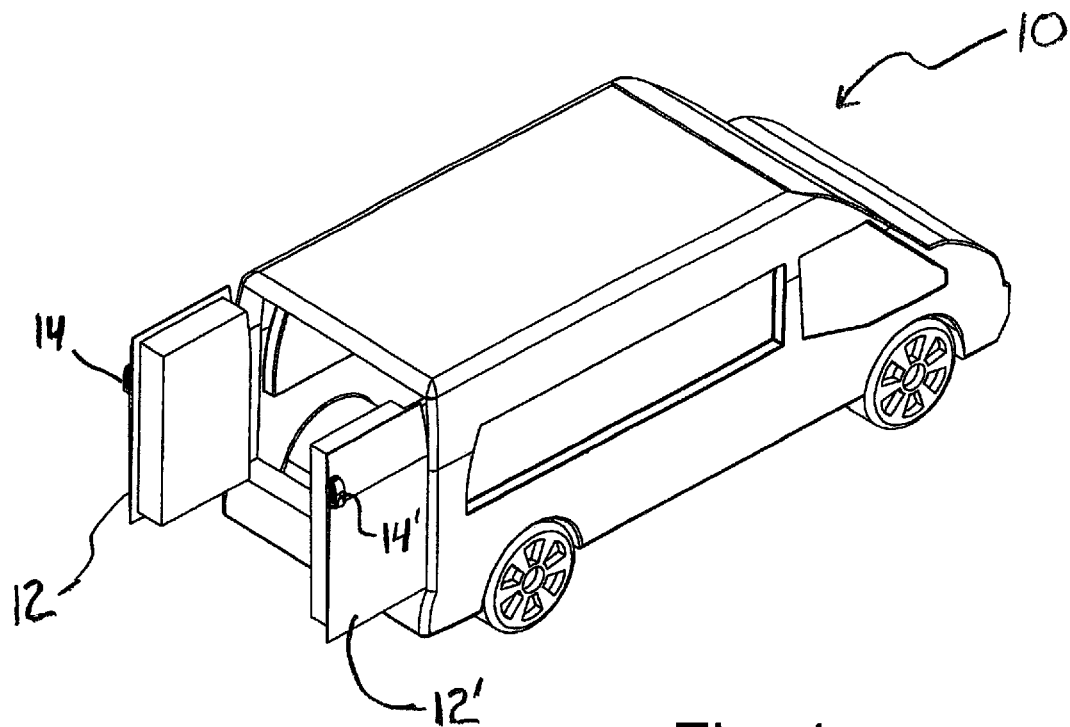
FIG. 1 is a perspective view schematically illustrating a cargo van and the present invention.

FIGS. 1-8 illustrate the warning light and illumination system of the present invention. FIG. 1 is a perspective view illustrating right and left light modules 14 and 14' of the present invention mounted on the rear cargo doors 12 and 12' of a cargo van 10. A cargo van is any vehicle capable of carrying cargo.

Figure 2:
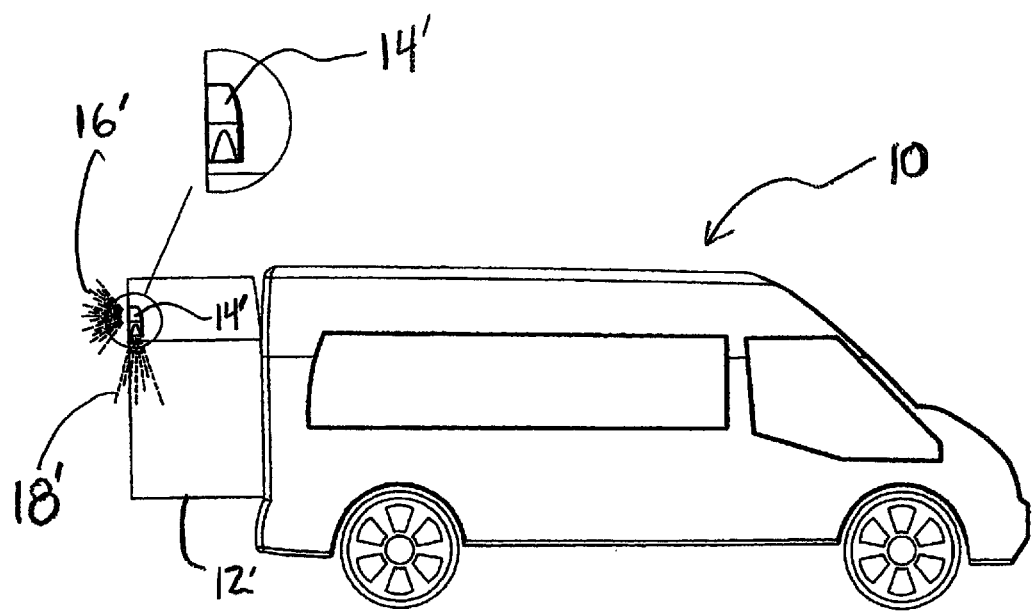
FIG. 2 is a right side elevation view schematically illustrating the cargo van and the present invention.

FIG. 2 is a right side elevational view of the cargo van 10 with the right rear cargo door 12' open. The light modules 14 and 14' provide the warning light and the illumination for the worker or driver of the cargo van 10. The light modules 14 and 14' provide auxiliary lighting that supplements the existing lighting provided on the cargo van 10 by the manufacturer. The light module 14' is illustrated being activated or on. The warning light illumination 16' is illustrated as being illuminated and directed to the rear of the cargo van 10 when the right cargo door 12' is open. The right white task floodlight 18' is illustrated illuminating downward providing additional task lighting for the worker or driver of the cargo van 10 when the cargo van rear door 12' is open.

Figure 3:
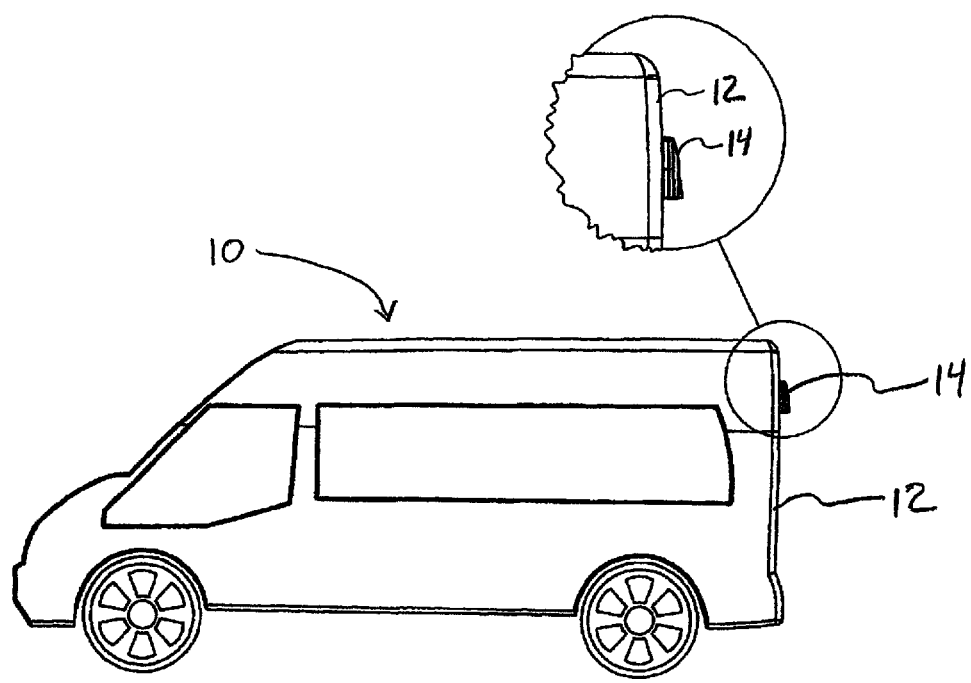
FIG. 3 is a left side elevation view schematically illustrating the cargo van and the present invention.

FIG. 3 is a left side elevational view of the cargo van 10 illustrating the left light module 14 attached to the left rear door 12 of the cargo van 10 with the cargo door 12 closed.

Figure 4:
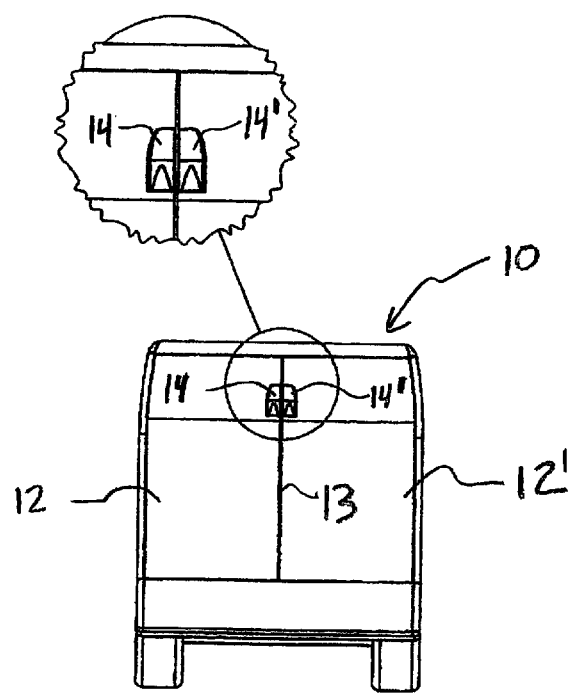
FIG. 4 is a rear elevational view schematically illustrating the cargo van and the present invention.

FIG. 4 is a rear elevational view illustrating the light modules 14 and 14' attached to the closed rear cargo doors 12 and 12' of the cargo van 10. Each light module 14 and 14' is attached adjacent the rear cargo door centerline 13 formed by the edges of each of the rear cargo doors 12 and 12' of the cargo van 10.

Figure 5:
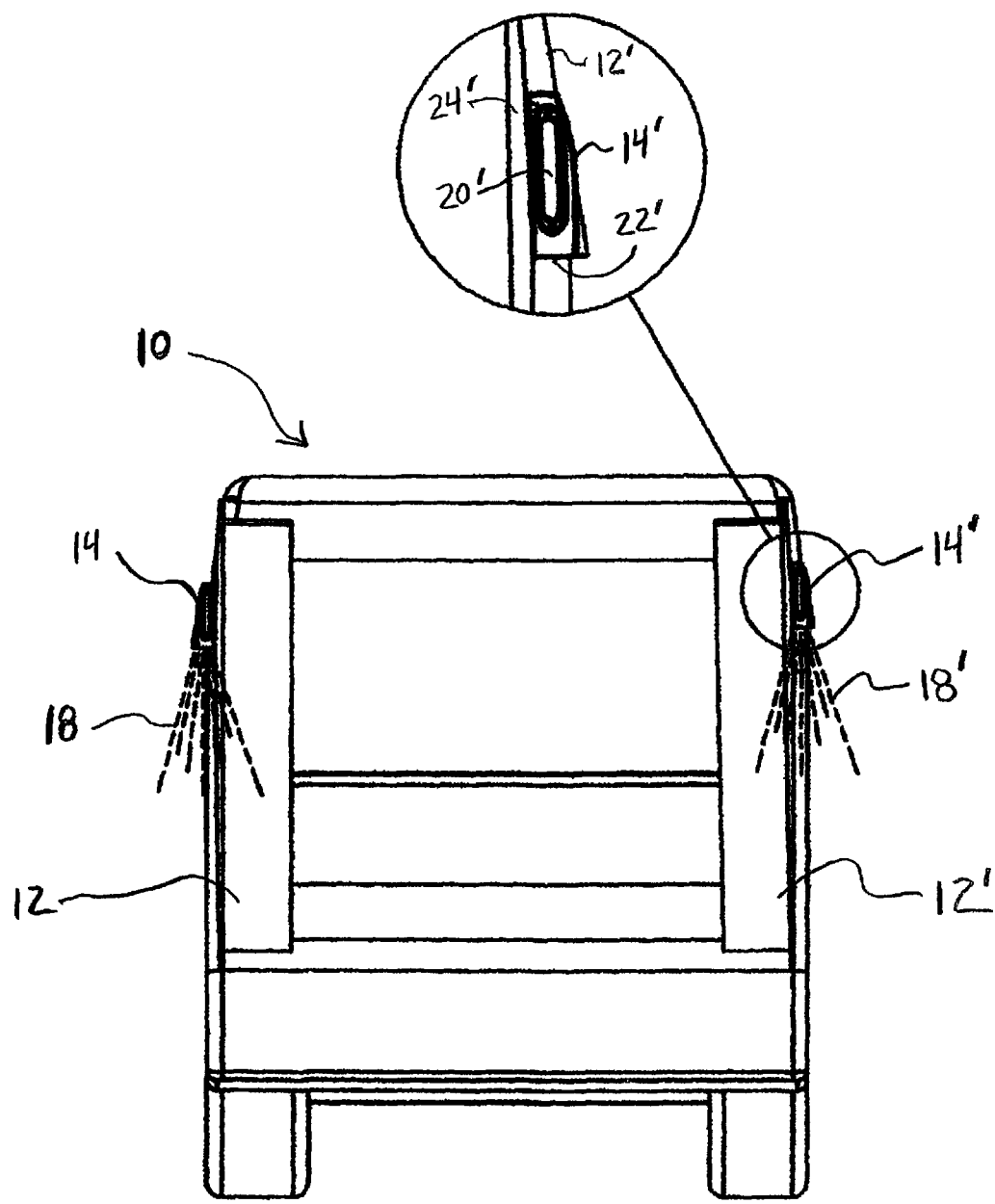
FIG. 5 is a rear elevational view schematically illustrating the cargo van and the present invention in operation illuminating the rear of the cargo van with the rear cargo van doors open.

FIG. 5 is a rear elevational view of the cargo van rear doors 12 and 12' in the open position with the light modules 14 and 14' operating and providing white task flood lighting 18 and 18'. The task flood lighting may also be other colors, such as red to improve night vision. An enlarged view of the right light module 14' is illustrated showing the amber warning light source 20' providing the amber warning light when on, and the white light source 22' providing the task flood light when on. The amber warning light source 20' may blink when on and may be coupled to the cargo van 10 electrical system to be activated with the flashing warning or hazard lights provided by the manufacture of the cargo van 10. The right light module 14' is illustrated attached to the edge 24' of the right cargo door 12'. It should be appreciated that the warning light source 20' has been indicated as amber, but any color suitable for easy visibility and providing a warning may be used.

Figure 6:
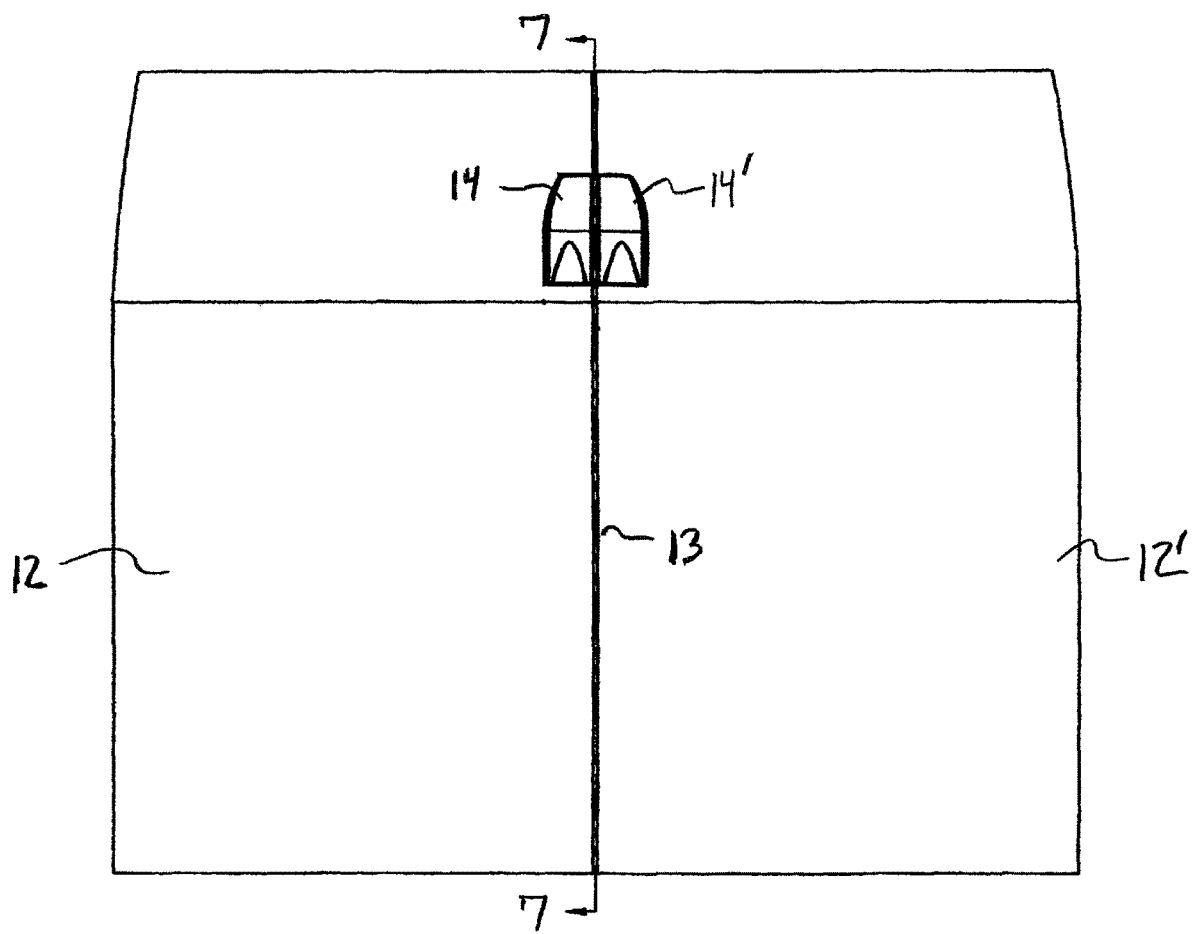
FIG. 6 is a rear elevational view schematically illustrating the cargo van and the present invention on the cargo van with the rear cargo van doors closed.

FIG. 6 is a rear elevational view of the rear cargo van doors 12 and 12' closed with the left light module 14 and the right light module 14' attached adjacent the edge of each cargo van doors 12 and 12' near the rear cargo door opening centerline 13.

Figure 7:
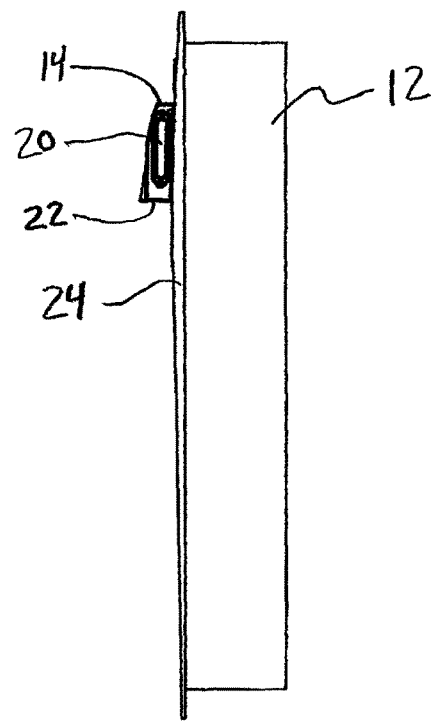
FIG. 7 is a side elevational view section schematically illustrating the side of the cargo van door with the present invention attached taken along line 7-7 in FIG. 6.

FIG. 7 is a side elevational view section of the left cargo door 12 taken along the line 7-7 in FIG. 6. FIG. 7 illustrates the left light module 14 attached adjacent the cargo door edge 24 of the left cargo door 12. The amber warning light source 20 of the left light module 14 is directed towards the cargo door edge 24. When the left cargo van door 12 is closed the amber warning light source 20 is directed towards the adjacent amber warning light source 20' and when the cargo van doors 12 and 12' are opened both amber warning light sources 20 and 20' are directed rearward away from the cargo van 10. The white light source 22 is directed downward towards the ground providing task floodlighting.

Figure 8:
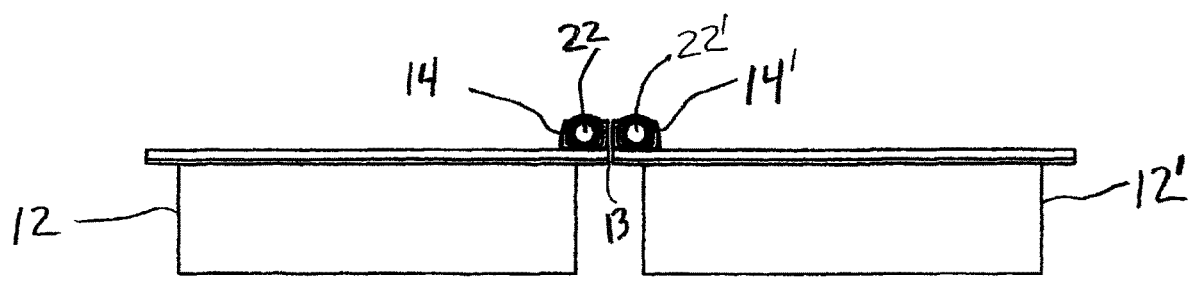
FIG. 8 is a bottom elevational view schematically illustrating the cargo van door with the present invention attached.

FIG. 8 is a bottom elevational view of the left rear cargo door 12 and the right rear cargo door 12' in a closed position showing the left light module 14 and the right light module 14' attached adjacent the rear cargo door opening centerline 13. The left white light source 22 and the right white light source 22' are illustrated on the light modules 14 and 14' and provide task floodlighting for the driver or worker.

Figure 9:
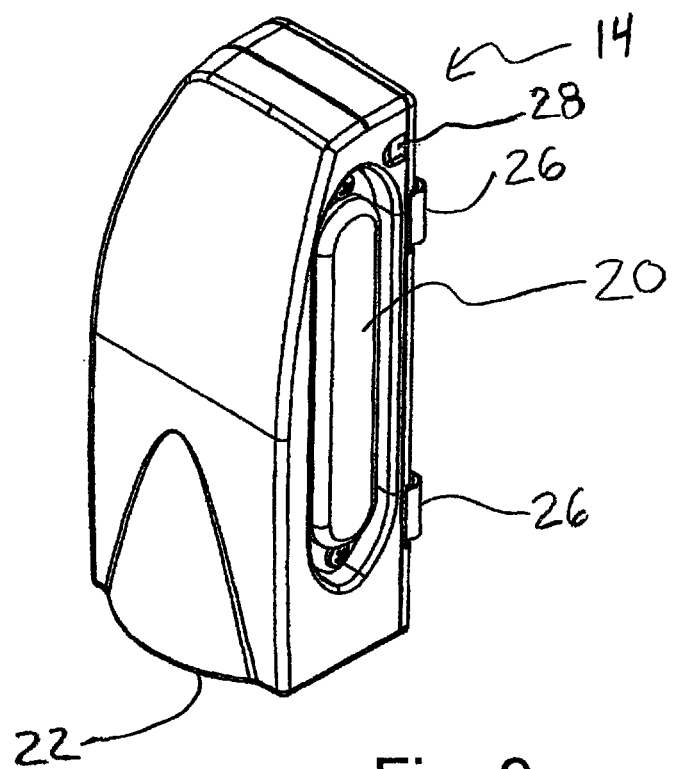
FIG. 9 is a front perspective view schematically illustrating a warning light and illumination module of the present invention.

FIGS. 9-14 illustrate in more detail the left light module 14. FIG. 9 is a front perspective view illustrating the left light module 14 of the warning light and illumination system of the present invention. The light module 14 shows the amber warning light source 20 and the white light source 22. The amber warning light source 20 and the white light source 22 have an illumination direction perpendicular to each other. In operation, the amber warning light source 20 points to the rear of the cargo van 10 when the cargo van door 12 is open and the white light source points downward towards the ground. The amber warning light source 20 provides visibility for oncoming traffic and the white light source 20 provides task floodlighting for the driver or worker. Attachment clips 26 are attached to a portion of the light module 14 adjacent the cargo van door 12 and are used to attach the light module 14 to an edge of the cargo van door 12. Different attachment means for attaching the light module 14 to the cargo van door 12 may be used, for example a magnet, suction cup, adhesive, pressure sensitive tape or other equivalent attachment means or mechanisms. Connection opening 28 is formed in the light module 14 and facilitates exit from the light module 14 of an electric wire for providing an electrical connection between the light module 14 and the electrical system of the cargo van 10.

Figure 10:
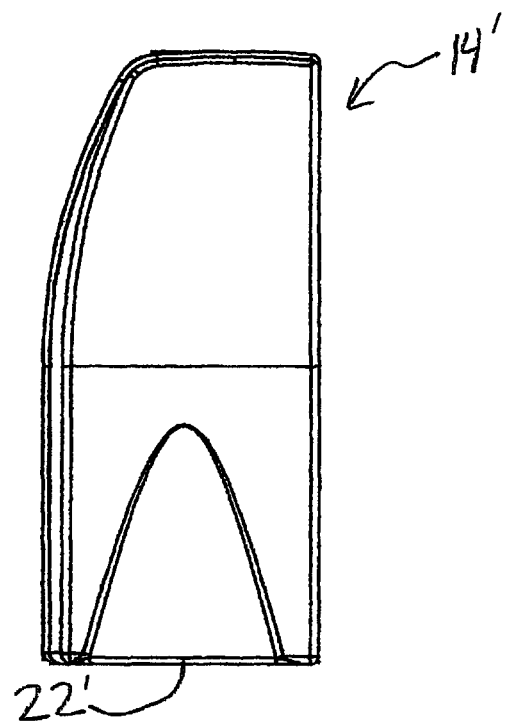
FIG. 10 is a side elevational view schematically illustrating a warning light and illumination module of the present invention.

FIG. 10 is a side elevational view of the right light module 14'. Also illustrated is the right task floodlight source 22'. The right light module 14' is a mirror image of the left light module 14.

Figure 11:
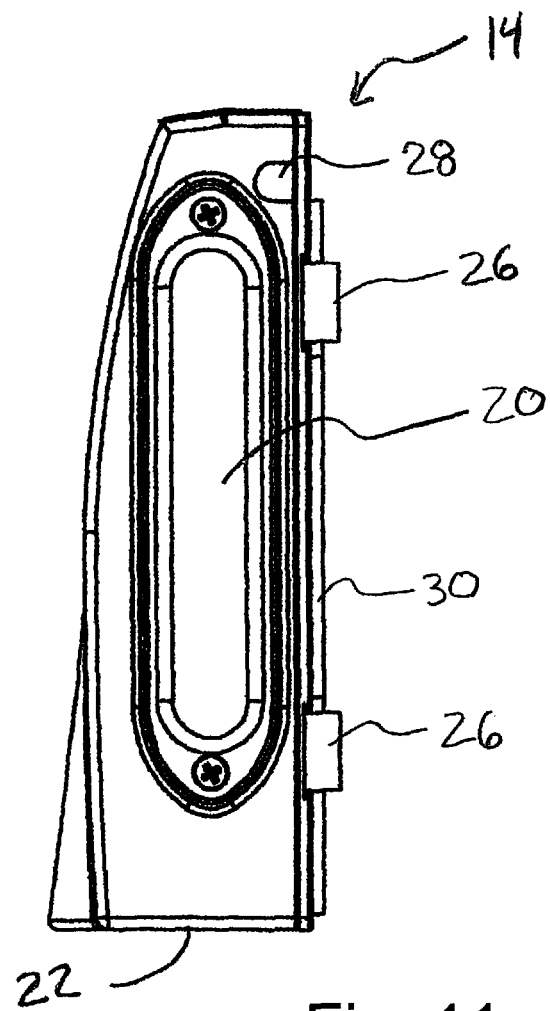
FIG. 11 is a side elevational view schematically illustrating the warning light and illumination module of the present invention.

FIG. 11 is a side elevational view showing the amber warning light source 20, the white light source 22, and the connection opening 28. Attachment clips 26 and adhesive 30, preferably used in combination with the attachment clips 26, are illustrated on the side of the light module 14 to be placed facing or adjacent an edge of the cargo van door 12 for attachment of the light module 14.

Figure 12:
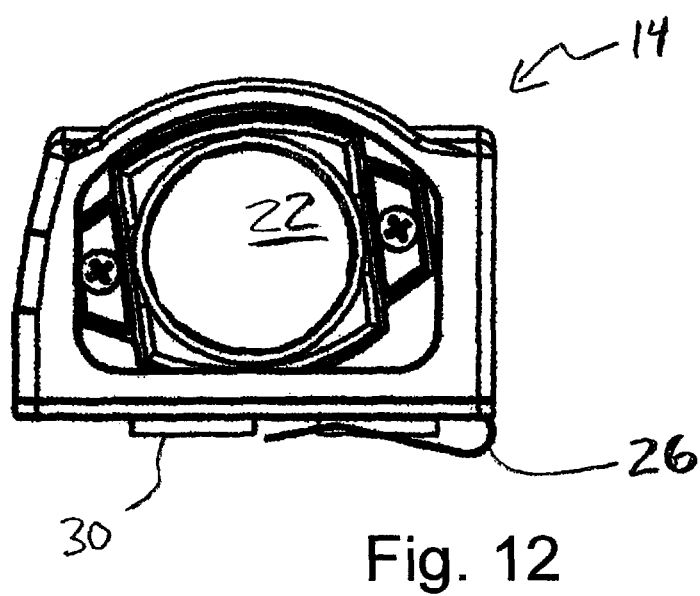
FIG. 12 is a bottom elevational view schematically illustrating the warning light and illumination module of the present invention.

FIG. 12 is a bottom elevational view of the left light module 14 with the attachment clips 26 and adhesive 30 illustrated. Attachment clips 26 may be a spring metal clip having an outer leg with a bias towards the light module 14. The white light source 22 is also illustrated.

Figure 13:
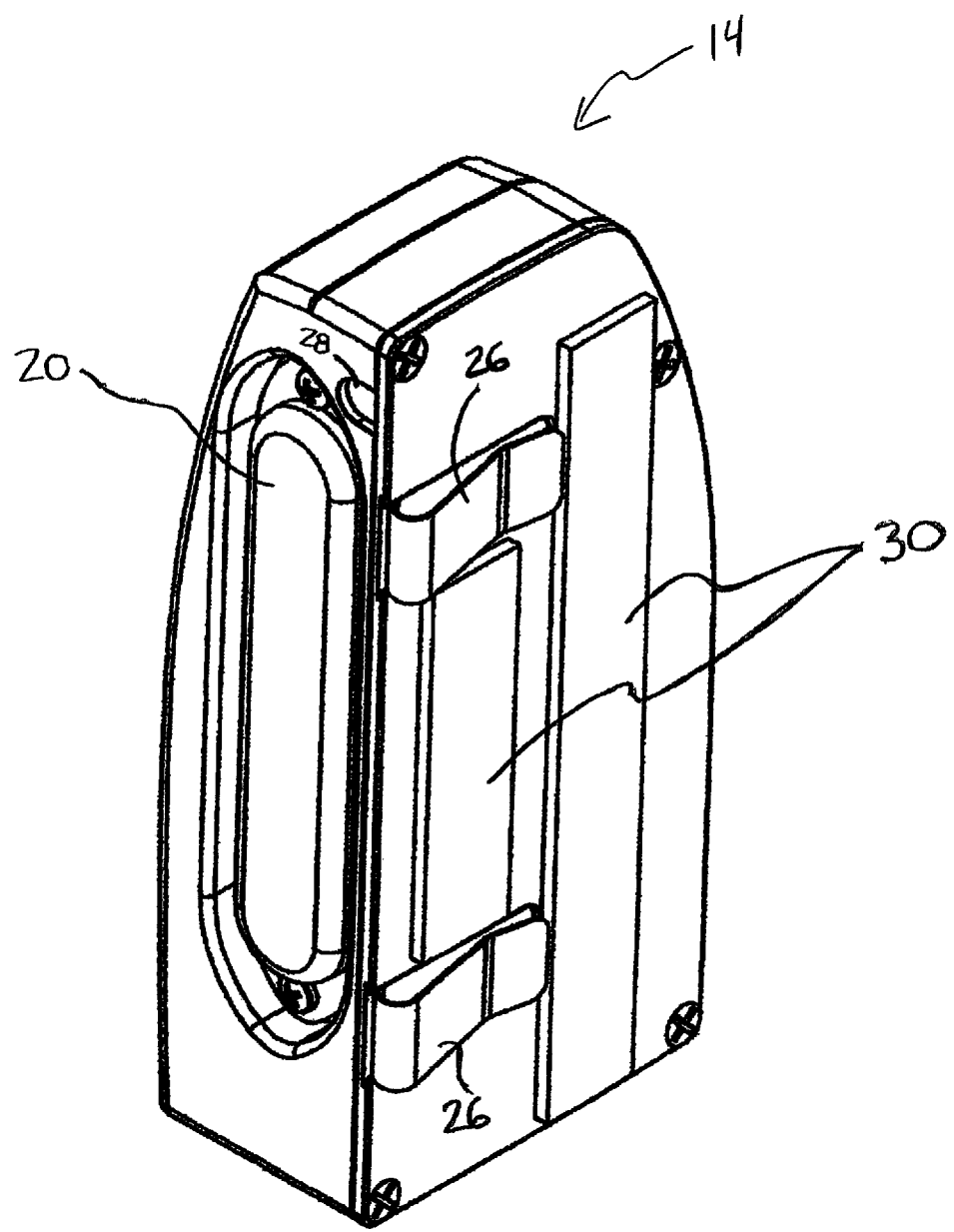
FIG. 13 is a rear perspective view schematically illustrating a warning light and illumination module of the present invention.

FIG. 13 is a perspective view of the light module 14 better illustrating the surface of the light module 14 adjacent and attaching to the cargo van door 12. The attachment clips 26 hold on to the cargo door edge 24, illustrated in FIG. 7, and secure the light module 14 to the cargo van door 12 with the assistance of the adhesive strips 30. The adhesive strips 30 may be replaced with friction rubber strips permitting easier removal of the light module 14 from the rear cargo door 12, if desired.

Figure 14:
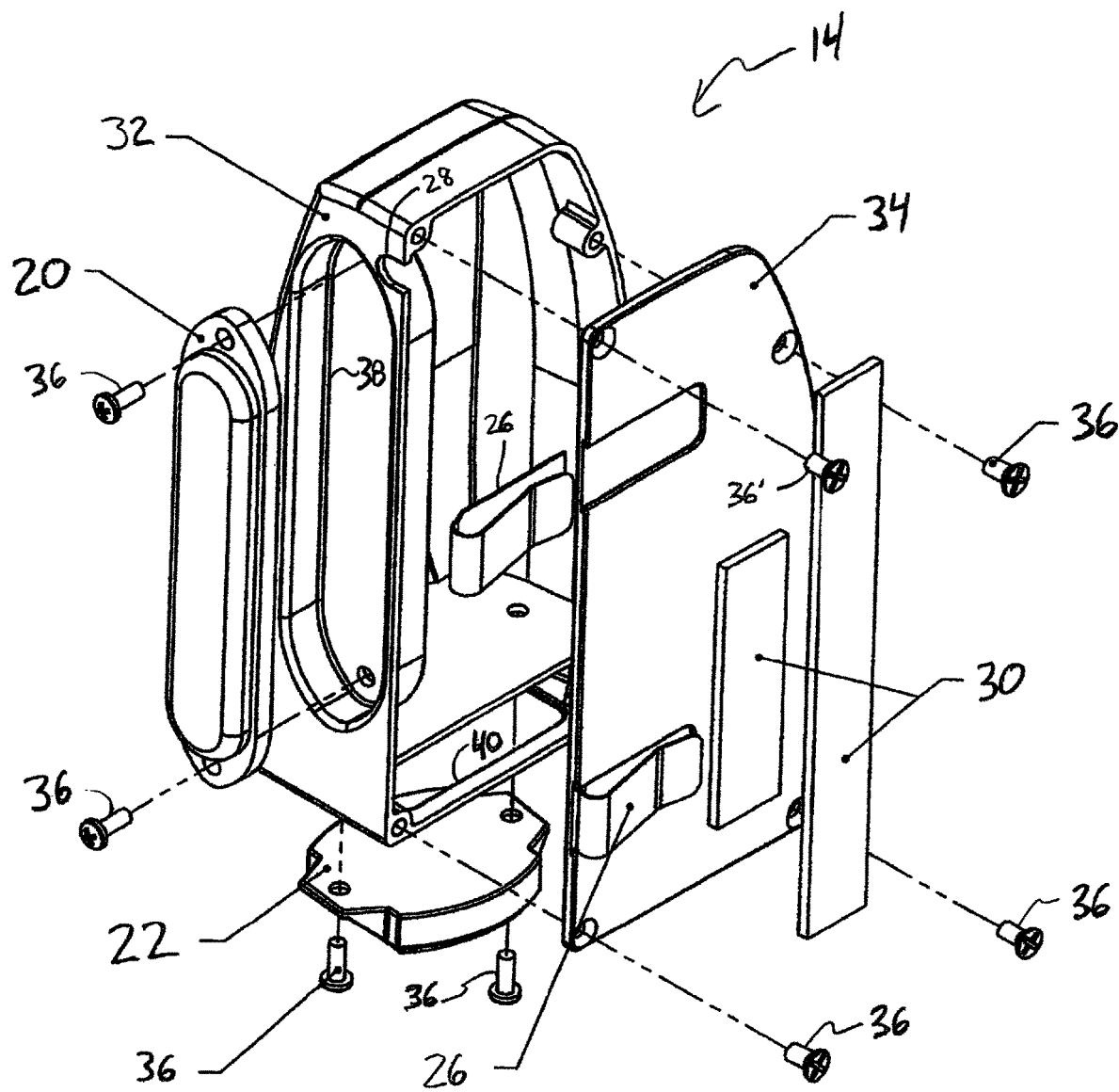
FIG. 14 is an exploded perspective view schematically illustrating a warning light and illumination module of the present invention.

FIG. 14 is an exploded perspective view of a preferred embodiment or construction of the left light module 14. The light module 14 comprises a housing 32 and a mounting plate 34. Attached to the mounting plate 34 are attachment clips 26 and adhesive 30. An amber warning light source opening 38 and a white light source opening 40 are formed in the housing 32. Fasteners or screws 36 are used to attach the amber warning light source 20 within the opening 38 and the white light source 22 within the opening 40 of the housing 32. The housing 32 may contain a control unit and electrical connections, not shown, for controlling the amber warning light source 20 and the white light source 22. The right light module 14' is a mirror image of the left light module 14 and is constructed and assembled similarly.

Figure 15:
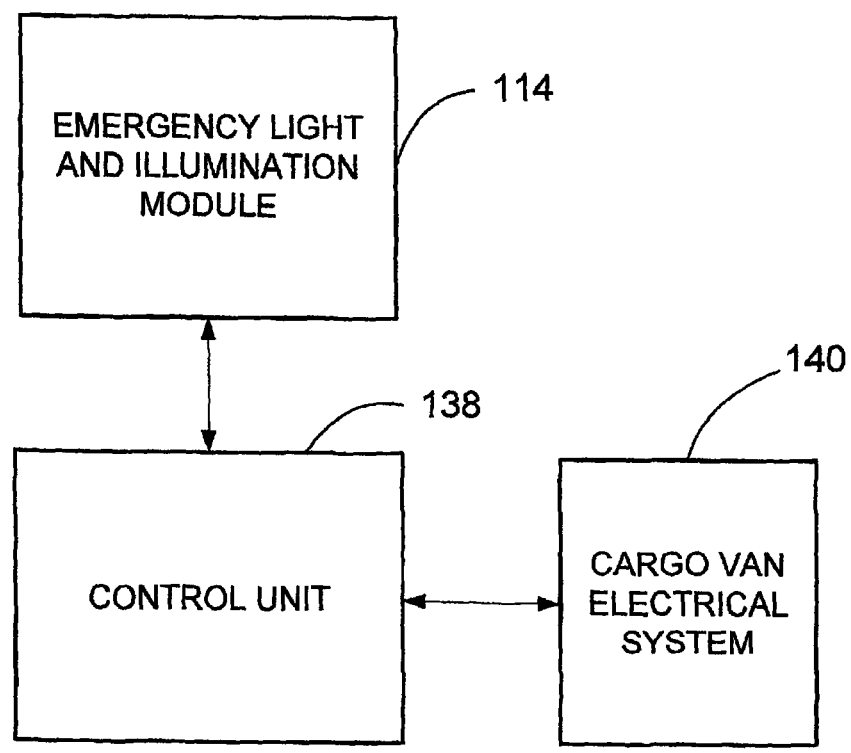
FIG. 15 is a block diagram of the warning light and illumination system of the present invention.

FIG. 15 is a block diagram illustrating the cargo van rear door warning light and illuminating system of the present invention. The warning light and illumination system comprises a warning light and illumination module or light module 114 coupled to a control unit 138 which is coupled to the cargo van electrical system 140. The control unit 138 works with the cargo van electrical system 142 to control an amber warning light source and a white light source contained within the light module 114. The control unit may be placed within the housing 32, illustrated in FIG. 14. The control unit may be programed or directed to active the amber warning light source and white light source in any desired sequence.

For example, a proximity or magnetic switch may be configured on the cargo doors 12 and 12' of the cargo van 10 so that when the cargo doors 12 and 12' are open the amber warning light sources 20 and 20' are controlled or activated to illuminate rearward and blink so as to warn oncoming traffic of the stop cargo van 10. Similarly, the white light source 22 and 22' may be controlled or activated to illuminate downward so as to project a task floodlight to improve visibility for the driver or worker. The amber warning light sources 20 and 20' and the white light sources 22 and 22' may be controlled by the driver or worker from within the cargo van 10 so as to illuminate the area in the rear of the cargo van 10 prior to the driver or worker exiting the cargo van 10 and proceeding to the rear cargo doors 12 and 12'. Electrical wires, not shown, may be routed from the connection opening 28 of the lighting modules 14 and 14' along the edge of the cargo van doors 12 and 12' and enter through an opening in in the cargo van 10 to connect to the electrical system of the cargo van 10. Accordingly, both power and electrical control may be provided to the lighting modules 14 and 14' by the electrical system of the cargo van 10.

The present invention provides an auxiliary cargo van rear door warning light and illumination system that augments the lighting system provided by the manufacturers of cargo vans that substantially improves worker safety in the use of cargo vans that require frequent delivery stops in high-traffic areas. The present invention improves visibility of a stopped cargo van when the rear cargo doors are open and also preferably provides additional task lighting in the rear of the cargo van to aid the driver or worker to quickly make deliveries during the evening hours with increased safety.

Although the preferred embodiments of the invention have been illustrated and described, it will be obvious to those skilled in the art that various modifications may be made without departing from the spirit and scope of this invention.

What is claimed is:

1. A cargo van rear door warning light and illumination system comprising:
    a housing having a front surface, a top surface, a bottom surface, and opposing side surfaces attached to the front surface, the top surface, and the bottom surface of said housing;
    a mounting plate attached to said housing opposing the front surface;
    attachment means, attached to said mounting plate, for attaching said mounting plate to a cargo van door on a cargo van;
    a warning light located on one of the opposing side surfaces of said housing;
    a task light located on the bottom surface of said housing; and
    a control unit attached to said warning light, said task light, and configured to couple to an electrical system of the cargo van, said control unit configured to activate either one of said warning light and said task light when the cargo van door is opened,
    whereby when the cargo van door is opened said warning light illuminates rearward and said task light illuminates downward.

2. A cargo van rear door warning light and illumination system as recited in claim 1 wherein:
    said control unit is placed within said housing.

3. A cargo van rear door warning light and illumination system as recited in claim 1 wherein:
    said attachment means comprises a clip.

4. A cargo van rear door warning light and illumination system as recited in claim 1 wherein:
    said attachment means comprises adhesive.

5. A cargo van rear door warning light and illumination system as recited in claim 1 wherein:
    said attachment means comprises a magnet.

6. A cargo van rear door warning light and illumination system as recited in claim 1 wherein:
    said attachment means comprises a suction cup.

7. A cargo van rear door warning light and illumination system as recited in claim 1 wherein:
    said attachment means comprises a mechanism.

8. A cargo van rear door warning light and illumination system as recited in claim 1 wherein:
said attachment means comprises a clamp.

* * * * *